US012294524B2

(12) United States Patent
Shah

(10) Patent No.: US 12,294,524 B2
(45) Date of Patent: May 6, 2025

(54) SERVICE FUNCTION CHAINING IN STATEFUL NETWORK

(71) Applicant: Hughes Network Systems, LLC, Germantown, MD (US)

(72) Inventor: Bhavit Shah, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 506 days.

(21) Appl. No.: 17/894,195

(22) Filed: Aug. 24, 2022

(65) Prior Publication Data
US 2024/0073145 A1 Feb. 29, 2024

(51) Int. Cl.
*H04L 47/2425* (2022.01)
*H04L 12/66* (2006.01)
*H04L 45/74* (2022.01)

(52) U.S. Cl.
CPC .......... *H04L 47/2425* (2013.01); *H04L 12/66* (2013.01); *H04L 45/74* (2013.01)

(58) Field of Classification Search
CPC ...... H04L 12/66; H04L 45/74; H04L 47/2425
USPC ........................................................ 709/238
See application file for complete search history.

(56) References Cited

U.S. PATENT DOCUMENTS

| | | | | |
|---|---|---|---|---|
| 2015/0195197 A1* | 7/2015 | Yong | ...................... | H04L 45/306 370/392 |
| 2015/0334094 A1* | 11/2015 | Suresh | ................ | H04L 12/6418 713/153 |
| 2016/0142321 A1* | 5/2016 | Gage | ...................... | H04W 76/10 370/235 |
| 2017/0104679 A1* | 4/2017 | Sunavala | ............... | H04L 45/306 |
| 2017/0250917 A1* | 8/2017 | Ruckstuhl | ............. | H04L 45/306 |
| 2018/0091420 A1* | 3/2018 | Drake | ...................... | H04L 45/64 |
| 2018/0219771 A1 | 8/2018 | Onno et al. | | |
| 2019/0116063 A1* | 4/2019 | Bottorff | .............. | H04L 47/2483 |
| 2019/0215268 A1* | 7/2019 | Tandel | ..................... | H04L 45/66 |
| 2022/0078113 A1* | 3/2022 | Rosen | ...................... | H04L 67/10 |
| 2022/0150160 A1* | 5/2022 | Kumar | ................ | H04L 12/4633 |

FOREIGN PATENT DOCUMENTS

EP 3195535 A1 7/2017
WO 2014182615 A1 11/2014

OTHER PUBLICATIONS

International Search Report and Written Opinion for PCT/US2023/067441 mailed Aug. 18, 2023 (16 pages).

* cited by examiner

*Primary Examiner* — David P Zarka
(74) *Attorney, Agent, or Firm* — Brooks Kushman P.C.

(57) ABSTRACT

A network is programmed to, based on a service function policy, determine a first service function chain of services to apply to outbound packets of a first type that arrive at a serving gateway; upon classifying a first outbound packet arriving at the serving gateway as the first type based on an identifier of the first outbound packet, route the first outbound packet to the services of the first service function chain; map the identifier to the first type such that the mapping is accessible by the packet gateway; determine a second service function chain of the same services to apply to inbound packets of the first type that arrive at a packet gateway; and upon classifying a first inbound packet arriving at the packet gateway as the first type based on the mapped identifier, route the first inbound packet to the services of the second service function chain.

20 Claims, 3 Drawing Sheets

SERVICE FUNCTION CHAINING IN STATEFUL NETWORK

BACKGROUND

Networks can be classified as stateless or stateful. A stateless network applies rules to each packet traveling over the network based on the header of the packet, without reference to any other packets traveling over the network. A stateful network retains data about a session or status of the network and applies rules to the packets traveling over the network according to the session or status as well as the headers.

DETAILED DESCRIPTION

Figure 1:
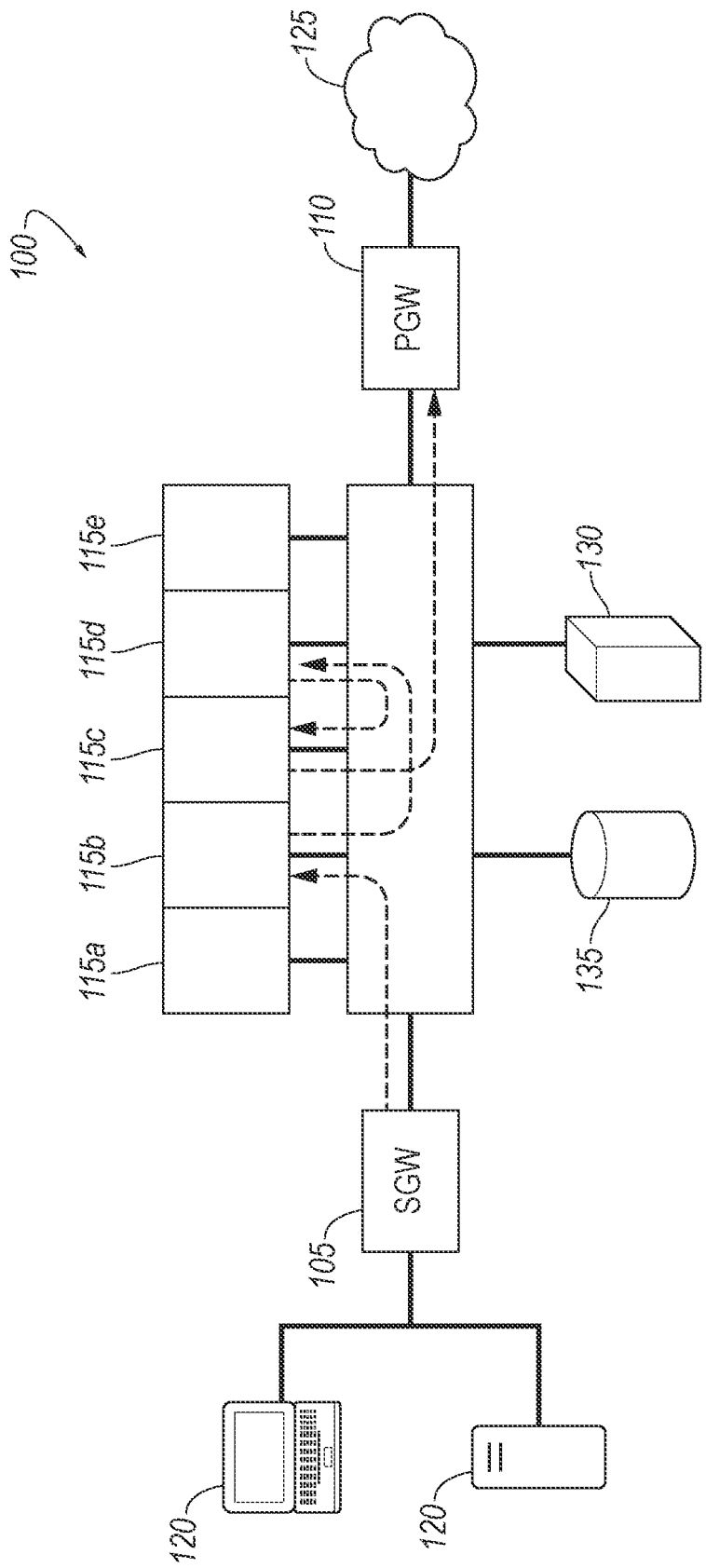
FIG. 1 is a block diagram of an example network.

This disclosure includes applying a service function chain to packets traveling through a stateful network, i.e., a network that stores data about past transactions in a network session, i.e., stores data about a state of the network session. For the purposes of this disclosure, a "service function chain" is defined in its networking sense of an ordered sequence of services to be applied to packets traveling through a network. Services are network tasks that are performed on packets, and are sometimes referred to as virtual network functions (VNF). Example services in a network include a firewall, deep packet inspection, intrusion detection system, intrusion prevention system, antivirus detection, parental control, video optimization, etc. While a stateless network can be programmed to apply a service function chain to a packet based solely on the header of the packet, a stateful network supports treating a packet based on the content of earlier packets, e.g., when a user starts a secure session with a particular website over the network. This disclosure provides techniques for efficiently providing services equally to both inbound and outbound packets in a stateful network.

With reference to the Figures, wherein like numerals indicate like parts throughout the several views, a network 100 includes a computer including a processor and a memory storing instructions executable by the process such that the computer is programmed to, based on a service function policy for a first type of packet 200, 205, determine a first service function chain to apply to outbound packets 200 of the first type that arrive at a serving gateway 105, the first service function chain including a set of services 115; upon classifying a first outbound packet 200 arriving at the serving gateway 105 as the first type based on an identifier of the first outbound packet 200, route the first outbound packet 200 to the services 115 of the first service function chain; map the identifier to the first type such that the mapping is accessible by a packet gateway 110; determine a second service function chain to apply to inbound packets 205 of the first type that arrive at the packet gateway 110, the second service function chain including the same set of the services 115 as the first service function chain; and upon classifying a first inbound packet 205 arriving at the packet gateway 110 as the first type based on the mapped identifier, route the first inbound packet 205 to the services 115 of the second service function chain.

The network 100 can be a stateful network and can efficiently handle outbound packets 200 and inbound packets 205 in an appropriate manner for a stateful network. As a stateful network, the network 100 may produce a higher quality of experience (QoE) by treating all or a subset of inbound packets 205 in the same manner as the corresponding outbound packets 200, e.g., higher-quality multimedia, reduced packet loss or packet delay, etc. The network 100 can ensure that outbound packets 200 and inbound packets 205 of a same type are routed through the same set of services 115, thereby providing high QoE for the stateful network. Moreover, packets 200, 205 can be routed through only services 115 useful for those packets 200, 205, rather than routed through all the services 115, thereby improving efficiency. Different packets 200, 205 can be routed through different sets of services 115.

With reference to FIG. 1, the network 100 provides a connection between user devices 120 and an external network 125. For example, the network 100 can be a local-area network (LAN); a LAN is a network that interconnects the user devices 120 within a limited area such as a residence, office, school, or university.

The user devices 120 are computing devices 130 such as desktop computers, laptop computers, mobile phones such as smartphones, tablets, internet-of-things (IoT) devices, gaming stations, etc. The user devices 120 are computing devices generally including a processor and a memory. The user devices 120 are connected to the network 100 with a wired or wireless connection, e.g., a Wi-Fi connection.

The external network 125 is a large network outside of the network 100 such as a wide-area network (WAN) or the Internet. A WAN is a network that interconnects groups of computing devices over a large geographic area. The WAN may be, e.g., a customer enterprise network.

Figure 2:
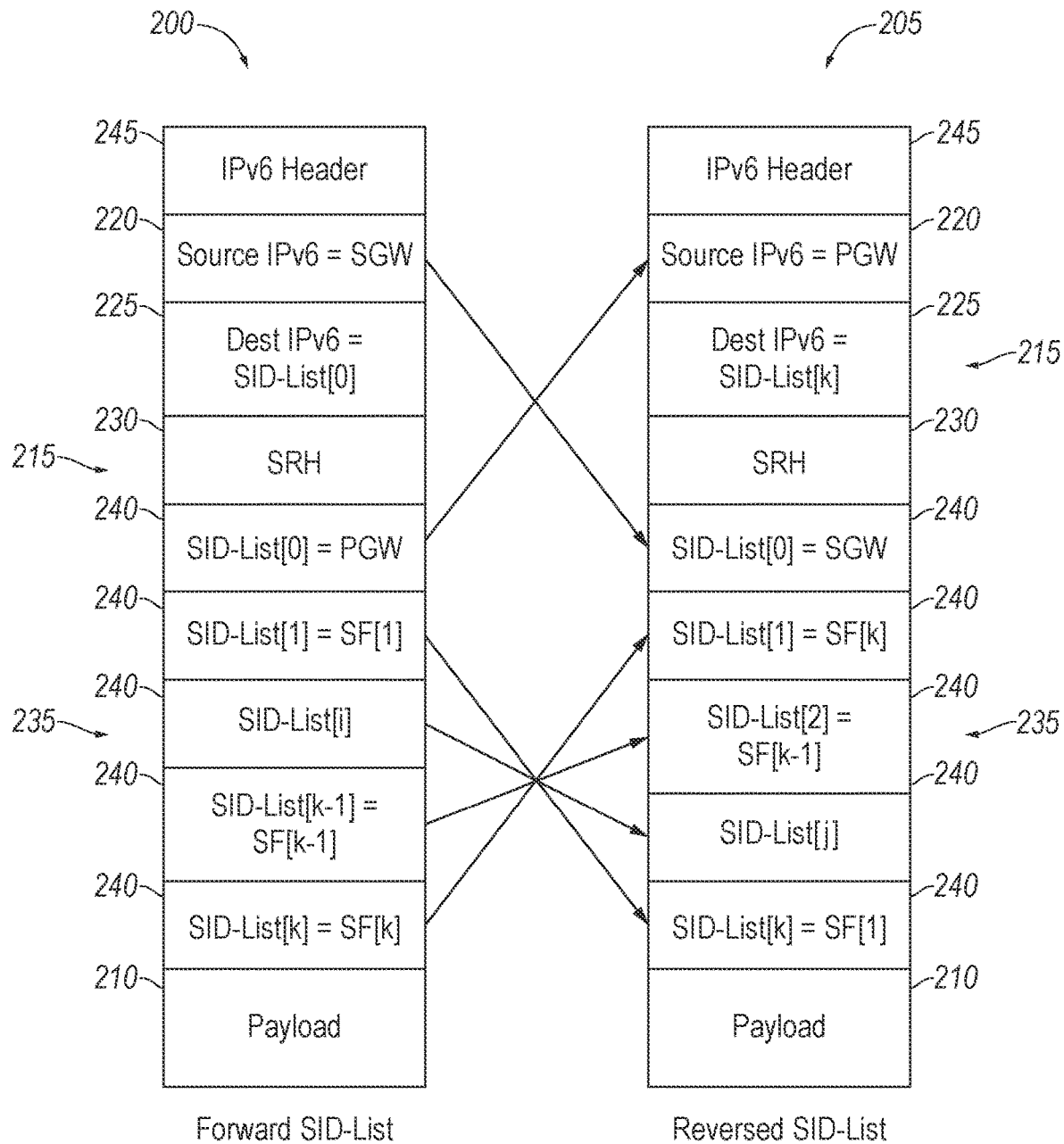
FIG. 2 is a diagram of examples of an outbound packet and an inbound packet.

The packets 200, 205, shown in FIG. 2, travel through the network 100 between one of the user devices 120 and the external network 125. The term "packet" is used in the networking sense of a formatted unit of data carried over a packet-switched network. The outbound packets 200 travel from one of the user devices 120 through the network 100 to the external network 125. The inbound packets 205 travel from the external network 125 through the network 100 to one of the user devices 120.

With reference to FIG. 2, the packets 200, 205 include a payload 210 and control information 215. The payload 210 is the data being provided to or sent by the application on the user device 120. The control information 215 is data for delivering the payload 210, e.g., a source 220, a destination 225, a segment routing header 230, error checking and detection, etc.

Returning to FIG. 1, the network 100 includes the serving gateway 105, the packet gateway 110, a plurality of computing devices 130 (other than the user devices 120), data stores 135, routers, hardware switches, wired and/or wireless connections, etc. This hardware provides the connection between the user devices 120 and the external network 125. The term "the computer" is used throughout this document to refer to any one or more of the foregoing items of hardware, e.g., the serving gateway 105, the packet gateway 110, one of the computing devices 130 separate from the serving gateway 105 and packet gateway 110, etc. The programming of the computer described below may be distributed to different pieces of hardware of the network 100, and any given step of programming below may be installed on one or multiple pieces of hardware of the network 100.

The network 100 may employ software-defined networking (SDN), which separates the data plane (i.e., forwarding packets 200, 205 through the network 100) from the control plane (i.e., defining rules for routing packets 200, 205 around the network 100). The network 100 may include nodes to which packets 200, 205 may be addressed. The nodes may correspond to physical hardware or may be virtual locations corresponding to network functions.

The serving gateway 105 is a connection point between the user devices 120 and the rest of the network 100. The serving gateway 105 may be a specific piece of physical hardware or a virtual node. An outbound packet 200 from one of the user devices 120 arrives at the network 100 via the serving gateway 105. The serving gateway 105 serves as a forward classifier for the outbound packet 200. For the purposes of this disclosure, a "forward classifier" is defined as a node that classifies an outbound packet 200 as the outbound packet 200 enters the network 100 from the user side. An inbound packet 205 that has traversed the network 100 is distributed from the serving gateway 105 to one of the user devices 120. The serving gateway 105 is the computer, is part of the computer, and/or is communicatively coupled to the computer.

The packet gateway 110 is a connection point between the external network 125 and the rest of the network 100. The packet gateway 110 may be a specific piece of physical hardware or a virtual node. An inbound packet 205 from the external network 125 arrives at the network 100 via the packet gateway 110. The packet gateway 110 serves as a return classifier for the inbound packet 205. For the purposes of this disclosure, a "return classifier" is defined as a node that classifies an inbound packet 205 as the inbound packet 205 enters the network 100 addressed to the user side. An outbound packet 200 that has traversed the network 100 is transmitted from the packet gateway 110 to the external network 125. The packet gateway 110 is the computer, is part of the computer, and/or is communicatively coupled to the computer.

The network 100 includes a plurality of services 115. The services 115 are network tasks that are performed on packets 200, 205, sometimes referred to as virtual network functions (VNF). For example, the services 115 may include a firewall, deep packet inspection, intrusion detection system, intrusion prevention system, antivirus detection, parental control, video optimization, etc. The services 115 may exist as virtual nodes set up by the software-defined networking. One service 115 may have multiple nodes, e.g., a primary node and a secondary node to which packets are routed if the primary node is saturated with traffic. The nodes reserved to a service 115 may be dynamically changed by a network controller or network orchestrator, e.g., for scaling the network 100, load-balancing the network 100, etc. Packets 200, 205 may thus be addressed to the services 115. The network 100 in FIG. 1 includes a first service 115a, a second service 115b, a third service 115c, a fourth service 115d, and a fifth service 115e, as an example.

For the purposes of this disclosure, as stated above, a "service function chain" is defined in its networking sense of an ordered sequence of services to be applied to packets traveling through a network. A service function chain includes a set of the services 115. The set of the services 115 for a given service function chain is a subset of the services 115 available on the network 100 and may include fewer services 115 than are available on the network 100. The service function chain includes an ordering of the set of the services 115. Two service function chains with the same set of the services 115 may thus be different by having different orderings of the set of the services 115. For example, a service function chain may be an encapsulation of a packet 200, 205 with a segment list 235 of segment identifiers 240, defined according to the standard for segment routing over IPv6 (SRv6), as illustrated in FIG. 2. The encapsulation may be defined according to other suitable protocols such as segment routing over multiprotocol label switching (SR-MPLS), network service header (NSH), etc. For the example service function chain of FIG. 1, the segment list 235 would include the segment identifiers 240 for the second service 115b, the fourth service 115d, and the third service 115c, in that order. For another example, a service function chain may include chained pairings of ingress-egress ports of the services 115. An ingress-egress port can be the addressing for one of the services 115. The chained pairings are ordered pairs of the ingress-egress ports, grouped together in sequence to form the service function chain. For the example service function chain of FIG. 1, the chained pairings are the second service 115b and the fourth service 115d, and then the fourth service 115d and the third service 115c.

The computer may be programmed to receive a plurality of service function policies for respective types of packets 200, 205, e.g., a service function policy for a first type of a packet 200, 205, another service function policy for a second type of packet 200, 205, and so on. For example, the service function policy may be sent by a network controller or network orchestrator of the network 100, or a user such as a network administrator may provide the service function policy as an input. Each service function policy may include the set of the services 115 to apply to packets 200, 205 of the respective type. Each service function policy may also include rules for identifying packets 200, 205 of the respective type, i.e., for classifying packets 200, 205 as the respective type or not. For example, the type may depend on a source 220, a destination 225, a source port, a destination port, a transport protocol, an application protocol, a 5-tuple classification, a special identifier, an identification of a user using the user device 120, a type of data of the payload 210 such as video, etc. The type may be determinable from an identifier of the packet 200, 205, which is a value of some portion of the packet 200, 205 such as the source 220, a header 245, the payload 210, etc.

The computer may be programmed to, based on a service function policy of a type of packet 200, 205, determine a first service function chain to apply to outbound packets 200 of that type that arrive at the serving gateway 105. The first service function chain includes the set of the services 115 from the service function policy. The first service function chain includes an ordering of the set of the services 115 based on, e.g., an ordering included in the service function policy, a set of rules from a network controller or network orchestrator for ordering the services 115, a topology of the network 100, a service plane configuration, etc. For example, the rules may include a default ordering of all the services 115 available on the network 100, and the computer may follow that ordering for the set of the services 115 included in the service function policy. The first service function chain may be a segment list 235 or a chain of the pairings of the ingress-egress ports, as described above. For example, the chain of pairings may be a bidirectional chain, i.e., a chain that may be traversed in either direction, e.g., depending on a specified starting ingress-egress port. The computer may store the first service function chain in one or more locations in the network 100, e.g., the serving gateway 105 and/or the data store 135.

The computer may be programmed to classify an outbound packet 200 arriving at the serving gateway 105 as the type associated with the first service function chain based on an identifier of the outbound packet 200. The outbound packet 200 includes the identifier. The identifier may be specified by the service function policy, and the identifier may be stored at the serving gateway 105. The identifier may be a value of some portion of the outbound packet 200 specified in the rules provided with the service function policy, e.g., the header 245, the payload 210, etc. Alternatively or additionally, the identifier may be a value aggregrated from multiple outbound packets 200, e.g., based on a machine-learning program for classifying packets. The multiple outbound packets 200 may be received in a burst or over an extended period.

The computer, e.g., the packet gateway 110, may be programmed to map the identifier of the outbound packet 200 to the first type such that the mapping is accessible by the packet gateway 110, e.g., in response to receiving the outbound packet 200 by the packet gateway 110. The mapping of the identifier to the first type may be a direct association between the identifier and the first type or an indirect mapping of the identifier to the first service function chain that is associated with the first type. For example, the computer may store the identifier, along with an association to the first type or to the first service function chain, in a location accessible by the packet gateway 110. The location accessible by the packet gateway 110 may be, e.g., the packet gateway 110 or the data store 135. The identifier may be stored at the same location as (or at one of the locations at which) the first service function chain is stored, and the identifier may be associated with the first service function chain at that location. For another example, the mapping of the identifier to the first type may already be stored at a location accessible by the packet gateway 110, and the packet gateway 110 is programmed to check for such mappings upon receiving an inbound packet 205. Thus, the packet gateway 110 may be configured to classify inbound packets 205 in the same manner as the outbound packets 200 are classified, as will be described below.

The computer may be programmed to, upon classifying an outbound packet 200 arriving at the serving gateway 105 as a type, route the first outbound packet 200 to the services 115 of the first service function chain and then to the packet gateway 110. Routing the outbound packet 200 includes routing the outbound packet 200 to the services 115 of the first service function chain according to the ordering of the first service function chain. For example, the computer may route the outbound packet 200 through the bidirectional chain of the pairings of ingress-egress ports of the services 115, starting at the service 115 listed first in the bidirectional chain, and then to the packet gateway 110 after the service 115 listed last. For another example, the computer may append the segment list 235 to the outbound packet 200, forming the outbound packet 200 as shown in FIG. 2, and route the outbound packet 200 to the services 115 associated with the segment identifiers 240 in the order of the segment list 235. The step of appending the segment list 235 may include encapsulating the outbound packet 200.

The packet gateway 110 may be programmed to, upon receiving an outbound packet 200, remove the segment list 235 from the outbound packet 200, e.g., by removing any encapsulation from the outbound packet 200. The packet gateway 110 may modify the source 220 of the outbound packet 200 to be the packet gateway 110 so that a corresponding inbound packet 205 can be addressed back to the network 100. The packet gateway 110 may also store the identifier and/or the first service function chain as described above. The packet gateway 110 transmits the outbound packet 200 to the external network 125.

The computer is programmed to determine a second service function chain to apply to inbound packets 205 that arrive at the packet gateway 110, the inbound packets 205 being the same type as associated with the first service function chain. This step may occur before receiving any inbound packets 205 of that type. The second service function chain includes the same set of the services 115 as the first service function chain. The second service function chain may have a second ordering of the services 115 that is a reverse of the first ordering, which beneficially reduces the complexity of determining the second service function chain. Alternatively, the second service 115b chain may have a different ordering of the same set of services 115 as the first service function chain, e.g., the same ordering as the first service function chain.

For example, determining the second service 115b chain may be a same step as determining the first service function chain. The bidirectional chain of the pairings of the ingress-egress ports of the services 115 may serve as the first service function chain and as the second service function chain. The computer, e.g., the serving gateway 105 or a computing device 130 on the network 100, may determine the bidirectional chain as described above and may transmit the bidirectional chain to the packet gateway 110, along with the identifier. When the bidirectional chain is used as the second service function chain, an inbound packet 205 enters the opposite end of the bidirectional chain as an outbound packet 200, meaning that the second service function chain has the reverse ordering as the first service function chain.

For another example, with reference to FIG. 2, determining the second service function chain may be performed by the packet gateway 110 in response to receiving an outbound packet 200 by the packet gateway 110. The packet gateway 110 may determine a reverse ordering of the segment list 235 from the outbound packet 200 and store the reverse ordering in the packet gateway 110 as the second service function chain. For example, the packet gateway 110 may construct a segment list 235 for the inbound packet 205 by setting the first segment identifier 240 of the second service function chain equal to the last segment identifier 240 of the first service function chain and executing a loop in which at each iteration the packet gateway 110 sets a next segment identifier 240 of the second service function chain equal to a previous segment identifier 240 of the first service function chain, until the packet gateway 110 has iterated through all the segment identifiers 240 of the segment list 235, as illustrated in FIG. 2.

The computer, e.g., the packet gateway 110, is programmed to classify an inbound packet 205 arriving at the packet gateway 110 as a type based on the mapping between the identifier and the first type, e.g., from a location accessible to the packet gateway 110 such as the packet gateway 110 or the data store 135. If the inbound packet 205 does not match any of the known types, the packet gateway 110 may drop the inbound packet 205 or may send a request for an identification to, e.g., the serving gateway 105 or a network controller on one of the computing devices 130 of the network 100.

The computer is programmed to, upon classifying the inbound packet 205 arriving at the packet gateway 110 as a type, route the inbound packet 205 to the services 115 of the associated second service function chain and then to the serving gateway 105. Routing the inbound packet 205 includes routing the inbound packet 205 to the services 115 of the second service function chain according to the ordering of the second service function chain. For example, the computer may route the inbound packet 205 through the bidirectional chain of the pairings of ingress-egress ports of the services 115, starting at the service 115 listed last in the bidirectional chain, and then to the serving gateway 105 after the service 115 listed first. The bidirectional chain may be stored on the packet gateway 110, or the packet gateway 110 may access the bidirectional chain (i.e., the first service function chain) from the data store 135 using the identifier. For another example, the computer may append the segment list 235 to the inbound packet 205, forming the inbound packet 205 as shown in FIG. 2, and route the inbound packet 205 to the services 115 associated with the segment identifiers 240 in the order of the segment list 235. The segment list 235 of the inbound packet 205 is constructed from the segment list 235 of an outbound packet 200 as described above.

Figure 3:
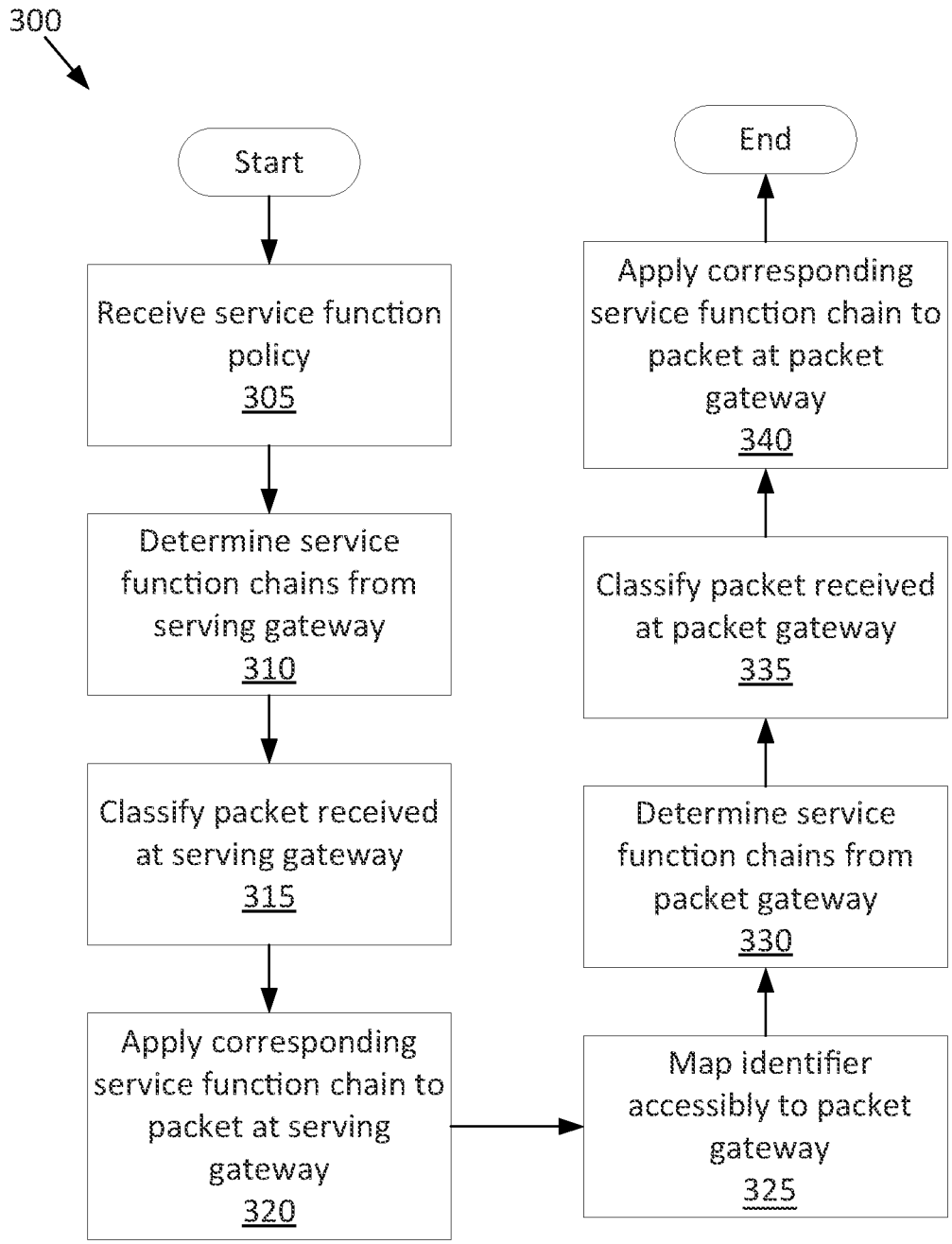
FIG. 3 is a process flow diagram of an example process for applying service function chains to packets traveling through the network.

FIG. 3 is a process flow diagram illustrating an example process 300 for applying service function chains to packets 200, 205 traveling through the network 100. The memory of the computer stores executable instructions for performing the steps of the process 300 and/or programming can be implemented in structures such as mentioned above. As a general overview of the process 300, the computer receives the service function policy, determines the first service function chain, classifies an outbound packet 200 received at the serving gateway 105, routes the outbound packet 200 from the serving gateway 105 according to the first service function chain, maps the identifier for the outbound packet 200 such that the mapping is accessible to the packet gateway 110, determines the second service function chain, classifies an inbound packet 205 received at the packet gateway 110, and routes the inbound packet 205 from the packet gateway 110 according to the second service function chain.

The process 300 begins in a block 305, in which the computer receives a service function policy for a first type of packet 200, 205, as described above.

Next, in a block 310, the computer determines a first service function chain to apply to outbound packets 200 of the first type that arrive at the serving gateway 105, based on the service function policy received in the block 305, as described above.

Next, in a block 315, the computer classifies a first outbound packet 200 arriving at the serving gateway 105 as the first type based on an identifier of the first outbound packet 200, as described above. The identifier was provided by the service function policy received in the block 305.

Next, in a block 320, the computer, upon classifying the first outbound packet 200 arriving at the serving gateway 105 as the first type, routes the first outbound packet 200 to the services 115 of the first service function chain determined in the block 310, as described above.

Next, in a block 325, the computer maps the identifier to the first type such that the mapping is accessible by the packet gateway 110, as described above.

Next, in a block 330, the computer determines a second service function chain to apply to inbound packets 205 of the first type that arrive at the packet gateway 110 based on the first service function chain determined in the block 310, as described above Next, in a block 335, the computer classifies a first inbound packet 205 arriving at the packet gateway 110 as the first type based on the mapped identifier from the block 325, as described above.

Next, in a block 340, the computer, upon classifying the first inbound packet 205 arriving at the packet gateway 110 as the first type, routes the first inbound packet 205 to the services 115 of the second service function chain determined in the block 330, as described above. After the block 340, the process 300 ends.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," etc. are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A network comprising:
a computer comprising a processor and a memory storing instructions executable by the processor such that the computer is programmed to:
based on a service function policy for a first type of packet, determine a first service function chain to apply to outbound packets of the first type that arrive at a serving gateway, the first service function chain including a set of services;
upon classifying a first outbound packet arriving at the serving gateway as the first type based on an identifier of the first outbound packet, route the first outbound packet to the set of services of the first service function chain;
map the identifier to the first type such that the mapping is accessible by a packet gateway;
determine a second service function chain to apply to inbound packets of the first type that arrive at the packet gateway, the second service function chain including the same set of the services as the first service function chain; and
upon classifying a first inbound packet arriving at the packet gateway as the first type based on the mapped identifier, route the first inbound packet to the set of services of the second service function chain.

2. The network of claim 1, wherein the computer is further programmed to route the first outbound packet to the packet gateway after routing the services of the first service function chain.

3. The network of claim 2, wherein the computer is further programmed to map the identifier to the first type in response to receiving the first outbound packet by the packet gateway.

4. The network of claim 2, wherein the computer is further programmed to determine the second service function chain in response to receiving the first outbound packet by the packet gateway.

5. The network of claim 1, wherein the computer includes the serving gateway.

6. The network of claim 1, wherein the computer includes the packet gateway.

7. The network of claim 6, wherein determining the second service function chain is performed by the packet gateway.

8. The network of claim 6, wherein the packet gateway is programmed to transmit the first outbound packet to an external network.

9. The network of claim 1, wherein the first service function chain has a first ordering of the services, and the second service function chain has a second ordering of the services that is a reverse of the first ordering.

10. The network of claim 1, wherein the set of the services of the first service chain is a subset of services available on the network.

11. The network of claim 1, wherein routing the first outbound packet to the services of the first service function chain includes appending a list of the services to the first outbound packet.

12. The network of claim 11, wherein the packet gateway is programmed to, upon receiving the first outbound packet, remove the list from the first outbound packet.

13. The network of claim 1, wherein the first service function chain and the second service function chain include chained pairings of ingress-egress ports of the services.

14. The network of claim 13, wherein determining the first service function chain is a same step as determining the second service function chain, and determining the first service function chain includes determining a bidirectional chain of the pairings of the ingress-egress ports of the services.

15. The network of claim 1, wherein the computer is further programmed to store the mapping of the identifier to the first type on the packet gateway.

16. The network of claim 1, further comprising a data store, wherein the computer is further programmed to store the first service function chain on the data store associated with the identifier, and routing the first inbound packet includes accessing the first service function chain from the data store using the identifier.

17. The network of claim 1, wherein the computer is further programmed to route the first inbound packet to the serving gateway after the services of the second service function chain.

18. The network of claim 1, wherein the first outbound packet includes the identifier.

19. The network of claim 1, wherein the first outbound packet arriving at the serving gateway is from a user device.

20. A method comprising:
- based on a service function policy for a first type of packet, determining a first service function chain to apply to outbound packets of the first type that arrive at a serving gateway of a network, the first service function chain including a set of services;
- upon classifying a first outbound packet arriving at the serving gateway as the first type based on an identifier of the first outbound packet, routing the first outbound packet to the set of services of the first service function chain;
- mapping the identifier to the first type such that the mapping is accessible by the packet gateway;
- determining a second service function chain to apply to inbound packets of the first type that arrive at a packet gateway of the network, the second service function chain including the same set of the services as the first service function chain; and
- upon classifying a first inbound packet arriving at the packet gateway as the first type based on the mapped identifier, routing the first inbound packet to the set of services of the second service function chain.

* * * * *